United States Patent [19]
Yoshioka et al.

[11] Patent Number: 4,639,146
[45] Date of Patent: Jan. 27, 1987

[54] THRUST BEARING

[75] Inventors: Masahiro Yoshioka, Ibaraki; Hideki Izumi, Tsuchiura; Hiroshi Inouye; Eiichi Hazaki, both of Ibaraki; Shiro Nakadaira, Tsuchiura, all of Japan

[73] Assignee: Hitachi, Ltd., Tokyo, Japan

[21] Appl. No.: 600,324

[22] Filed: Apr. 13, 1984

[30] Foreign Application Priority Data

Apr. 15, 1983 [JP] Japan ................... 58-65389

[51] Int. Cl.[4] ............... F16C 27/00; F16C 27/08; F16C 17/06
[52] U.S. Cl. ..................... 384/99; 384/224; 384/303; 384/308
[58] Field of Search ........... 384/99, 121, 122, 123, 384/124, 223, 224, 302-312

[56] References Cited

U.S. PATENT DOCUMENTS

| | | | |
|---|---|---|---|
| 1,425,979 | 8/1922 | Kingsbury | 384/224 |
| 1,438,053 | 12/1922 | Parsons et al. | 384/303 |
| 1,684,693 | 9/1928 | Böhm | 384/224 |
| 3,011,839 | 12/1961 | Gruber | 384/308 |
| 3,033,619 | 5/1962 | Ertl et al. | 384/308 |

FOREIGN PATENT DOCUMENTS

| | | | |
|---|---|---|---|
| 178767 | 6/1954 | Austria | 384/303 |
| 566741 | 12/1958 | Canada | 384/303 |
| 720909 | 5/1942 | Fed. Rep. of Germany | 384/303 |
| 1177421 | 9/1964 | Fed. Rep. of Germany | 384/303 |
| 1010959 | 6/1952 | France | 384/303 |
| 1039434 | 8/1966 | United Kingdom | 384/303 |

OTHER PUBLICATIONS

Machine Design, Jan., 1981, vol. 25, No. 1, FIG. 15, p. 65.

Primary Examiner—Stuart S. Levy
Assistant Examiner—Thomas R. Hannon
Attorney, Agent, or Firm—Antonelli, Terry & Wands

[57] ABSTRACT

A thrust bearing has a plurality of bearing pads each provided on its back side with a pivot, and a support on which the pads are disposed in the circumferential direction. An integral carrier is mounted on the support. The carrier has leg portions and a resilient portion and defines a squeeze film damper portion between the rear surface thereof and the opposing surface of the support. The pads are carried tiltably by the carrier through the pivots.

5 Claims, 13 Drawing Figures

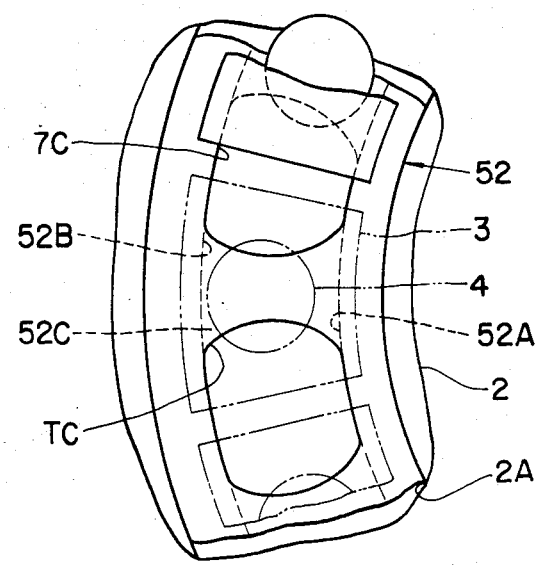
FIG. 5
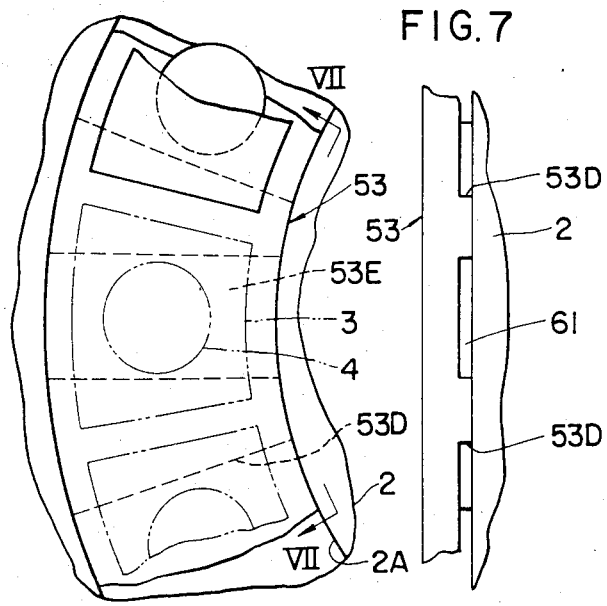
FIG. 6
FIG. 7

4,639,146

THRUST BEARING

BACKGROUND OF THE INVENTION

The present invention relates to a thrust bearing of tilting pad type and, more particularly, to a thrust bearing improved to ensure a uniform thrust load distribution and an effective oscillation damping.

The conventional thrust bearing of tilting pad type has a plurality of bearing pads arranged tiltably and disposed in the circumferential direction of the bearing. In this type of thrust bearing, it is quite an effective measure to provide means for ensuring a uniform thrust load distribution and damping of oscillation which may be caused by an external force such as earthquake. A typical conventional arrangement for such a purpose employs resilient members such as leaf springs between the thrust bearing pads and the support by which the pads are supported. This measure is shown in a magazine "Machine Design" (vol. 25, No. 1), published from Nippon Kogyo Shinbun-sha, Japan, in Jan. 1981, particularly in FIG. 15, page 65. This known arrangement is considered mainly for uniform distribution of the thrust load. On the other hand, there is an increasing demand for thrust bearings having excellent durability against heavy thrust load, as well as a high reliability. Unfortunately, however, there is no actual thrust bearing which can cope with this demand.

SUMMARY OF THE INVENTION

Accordingly, an object of the invention is to provide a thrust bearing which can realize a uniform distribution of the thrust load over all bearing pads.

Another object of the invention is to provide a thrust bearing which has an excellent reliability, durability and vibration damping performance.

To these ends, according to one aspect of the invention, there is provided a thrust bearing of the type having a plurality of bearing pads each provided on its back side with a pivot, and a support on which the pads are tiltably supported through the pivots and disposed in the circumferential direction, characterized by comprising: an integral carrier mounted on the support and having leg portions and a resilient portion and defining a squeeze film damper portion between the rear surface thereof and the opposing surface of the support, the pads being carried by the carrier through the pivots.

These and other objects, features and advantages of the invention will become clear from the following description of the preferred embodiment taken in conjunction with the accompanying drawings.

BRIEF DESCRIPTION OF THE DRAWINGS

FIGS. 3 and 5 are plan views of different examples of apertures used in the first embodiment of the thrust bearing shown in FIG. 1;

FIG. 6 is a plan view of a second embodiment of the thrust bearing in accordance with the invention;

FIG. 7 is a sectional view taken along the line VII—VII of FIG. 6;

DETAILED DESCRIPTION OF THE PREFERRED EMBODIMENTS

Figure 1:
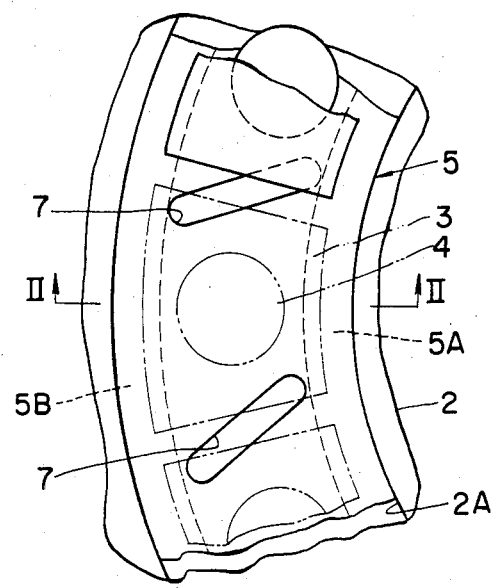
FIG. 1 is a plan view of a first embodiment of the thrust bearing in accordance with the invention.
Figure 2:
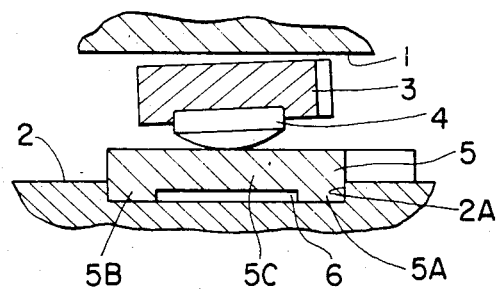
FIG. 2 is a sectional view taken along the line II—II of FIG. 1.

Preferred embodiments of the invention will be described hereinunder with reference to the accompanying drawings. Referring first to FIGS. 1 and 2 showing a first embodiment of the invention, a thrust bearing in accordance with the invention has a thrust collar 1 adapted to rotate as a unit with the rotary shaft, while a numeral 2 designates a support. The thrust bearing further has a plurality of bearing pads 3 opposite to the thrust collar 1 and adapted to bear the thrust load. The bearing pads 3 are provided at their rear sides with pivots 4 for permitting rocking of the bearing pads 3. The bearing pads 3 are arranged in the circumferential direction at a predetermined pitch, and are supported by an integral annular carrier 5 which is received and located by an annular groove 2A formed in the support 2. The carrier 5 is constituted by an inner peripheral supporting leg 5A, an outer peripheral supporting leg 5B and a resilient portion 5C disposed between these legs 5A and 5B, and is formed of a metallic material. A squeeze film damper portion 6 of a thickness ranging between, for example, 0.01 and 1 mm is formed between the rear side of the spring portion 5C and the support 2. A plurality of apertures 7 are formed in the resilient portion 5C of the carrier 5 at portions between two adjacent pivots 4. These apertures are intended for optimizing the elastic modulus of the resilient portion 5 and the attenuation factor of the squeeze film damper portion 6. In this embodiment, these apertures are elongated slots inclined with respect to the radial lines.

The operation of the first embodiment of the thrust bearing is as follows.

When a thrust load is applied to the bearing pads 3 through the thrust collar 1, the thrust bearing pads 3 bear the thrust load thanks to the elastic deformation of the spring portion 5C of the integral carrier 5 and the damping effect of the squeeze film damper portion 6. In this case, since the bearing pads 3 present uniform height of the load bearing surface, the thrust load is uniformly distributed to all bearing pads without making any concentration to any specific pad or pads 3. Consequently, the durability of the bearing is increased remarkably. In addition, the squeeze film damper portion 6 absorbs oscillation of vibration which may be caused by an external force such as that produced by earthquake. When an excessive thrust load is applied to the resilient portion 5C of the carrier 5, the squeeze film damper portion 6 backs up the resilient portion 5 to prevent excessive deformation and, hence, breakdown of the latter.

Figure 3:
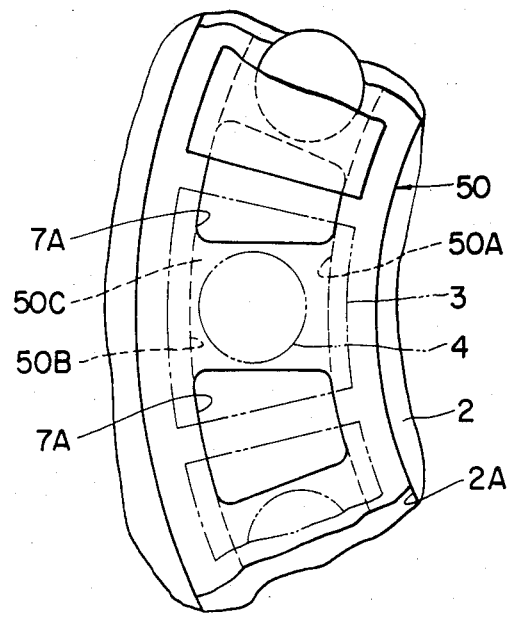
Figure 4:
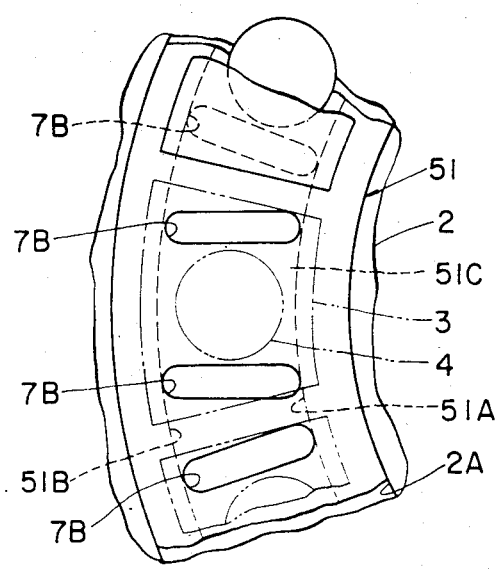

Although the apertures 7 shown in FIG. 1 have the form of elongated slots, this form is not exclusive and the aperture 7 can have various suitable forms. Namely, in a modification shown in FIG. 3, the aperture 7A has a sector shape so that the part of the resilient portion 50 contacted by the pivot 4 has a substantially square form. In another modification shown in FIG. 4, two apertures 7B each having the form of an elongated slot are provided at both sides of each pivot 4 so that the part of the resilient portion 51 contacted by the pivot 4 has a square form also in this modification. In still another modification shown in FIG. 5, the aperture 7C is so shaped as to reduce the width of the central part of the resilient portion 52 contacted by the pivot 4. The apertures 7, 7A, 7B and 7C can have various other forms depending on the selection of the elastic modulus of the resilient portions 50 to 52. From the view point of the optimum design of the elastic modulus, it is preferred to use the apertures 7A and 7B which define substantially square forms of the acting regions of the spring portions 50 and 51. In addition, it is possible to obtain any desired attenuation factor of the squeeze film damper portion 6 by suitably selecting the shapes of the resilient portions 50, 51 and gap behind these portions.

FIGS. 6 and 7 show a second embodiment of the thrust bearing in accordance with a second embodiment of the invention, in which the same reference numerals are used to denote the same parts or members as those in FIGS. 1 and 2. The integral carrier 53 of this embodiment has radial supporting legs extending in the radial directions and spaced in the circumferential direction, and resilient portions 53E between adjacent supporting leg portions 53D. A squeeze damper portion 61 having minute gap is formed between the back surface of each resilient portion 53E and the support 2. Also, supporting legs 53D are formed to have sector planar shape to define rectangular planar shape of the resilient portion 53E.

According to this arrangement, it is possible to obtain a high durability and reliability of the bearing pads 3 as in the case of the embodiments shown in FIGS. 1 and 2.

Figure 8:
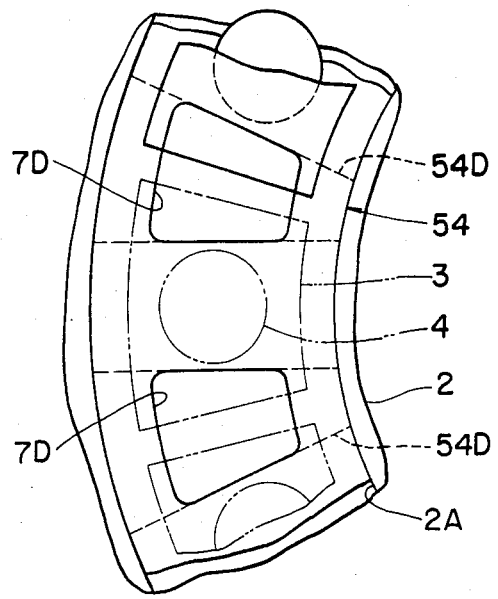
FIGS. 8 to 10 are plan views showing different examples of apertures used in the second embodiment of the thrust bearing shown in FIG. 6.
Figure 9:
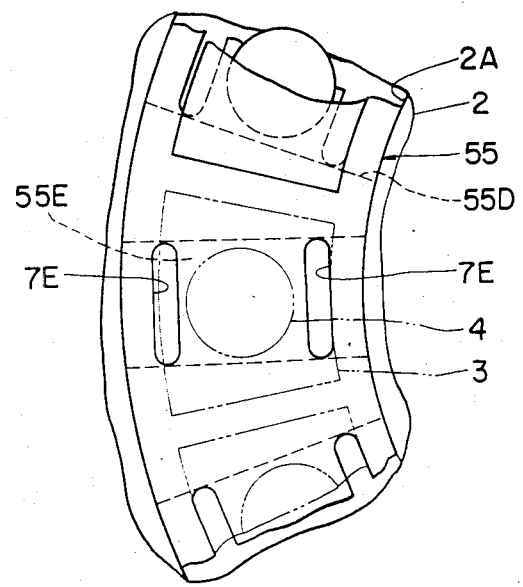
Figure 10:
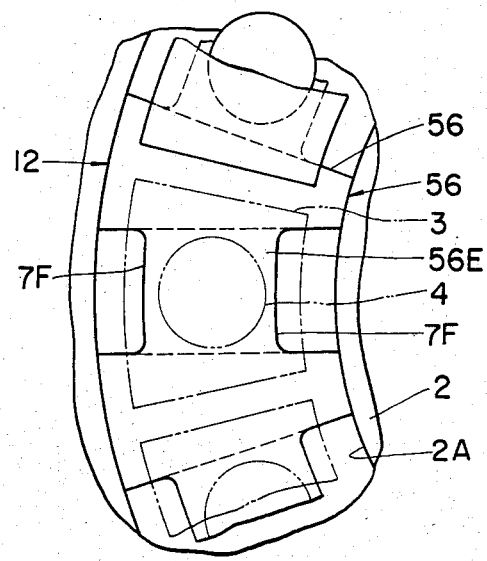

The carrier 53 shown in FIGS. 6 and 7 having radial supporting legs 53D may be provided with sector-shaped apertures 7D in the supporting legs 54D as shown in FIG. 8 or with elongated slots 7E at the radially inner and outer sides of each resilient portion 55E, in order to adjust the elastic modulus of the resilient portion 53E as shown in FIG. 9. It is also possible to provide notches 7F at the radially inner and outer sides of the resilient portion 56E as shown in FIG. 10.

Figure 11:
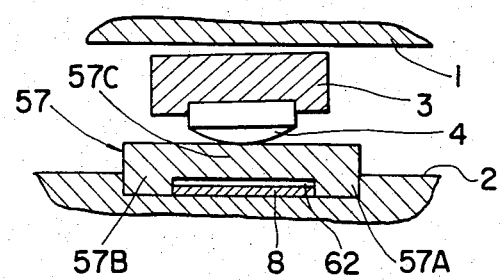
FIGS. 11 to 13 are vertical sectional views of other examples of the squeeze film dampers used in the thrust bearing of the invention.
Figure 12:
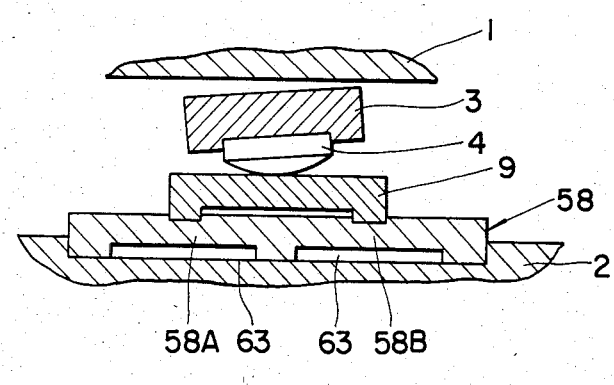
Figure 13:
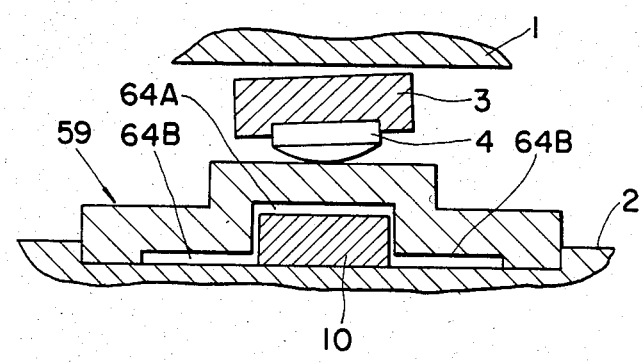

As shown in FIG. 11, a spacer 8 may be placed in the gap constituting the squeeze film damper to vary the size of the gap, in order to adjust the attenuation factor of the squeeze film damper portion 6. FIG. 12 shows another modification in which the bearing pads 3 are supported through the medium of an intermediate carrier 9 by a structure which is composed of two concentric carriers 58A and 58B integrated with each other. In this case, the squeeze film damper portion 63 is formed beneath each carrier 58A, 58B. This arrangement permits not only the adjustment of the attenuation factor of the squeeze film damper portion 62 and the elastic modulus of the resilient portion of the carrier, but also a higher reliability of the bearing through a reduction in the stress because the thrust load is shared by two carriers 58A and 58B. FIG. 13 shows still another modification in which the resilient portion of the carrier 59 is stepped to have a central protrusion. A spacer 10 is disposed on the portion of the support 2 behind the central protrusion thereby to define a central squeeze film damper 64A, as well as inner and outer squeeze film dampers 64B, 64B. According to this arrangement, it is possible to attain attenuation performances matching with various levels of load.

Thus, the second embodiment of the thrust bearing of the invention permits the design and construction of the carrier in one body, and facilitates the design for optimizing the elastic modulus and attenuation factor.

As has been described, according to the invention, the thrust load is distributed uniformly to all bearing pads thanks to the provision of a carrier having an integral construction. It is, therefore, possible to obtain a thrust bearing in which excellent durability, oscillation damping effect and reliability are achieved simultaneously with a simple construction.

What is claimed is:

1. A thrust bearing of the type having a plurality of bearing pads, pivots being provided on a back side of said bearing pads, an annular carrier having supporting legs and a resilient portion between said supporting legs, a plurality of apertures being provided in said resilient portion, and support means for said annular carrier, wherein a rear side of said resilient portion, said supporting legs and said support means define a squeeze film damper gap.

2. A thrust bearing according to claim 1, wherein said supporting legs comprise a peripherally extending supporting leg provided on a radially inward side of said carrier, and a peripherally extending supporting leg provided on a radially outward side of said carrier.

3. A thrust bearing according to claim 1, wherein said supporting legs comprise a first radially extending support leg and a second radially extending support legs, said first and second support legs being spaced peripherally from each other.

4. A thrust bearing according to either one of claims 2 or 3, wherein the gap is variable by means of a spacer provided on said support means opposite the rear side of said resilient portion.

5. A thrust bearing according to claim 4, wherein a multiplicity of squeeze film damper portions are formed in the gap by means of a plurality of integral carriers placed one on another.

* * * * *